United States Patent

[11] 3,631,339

[72] Inventors George M. Low
Acting Administrator of the National Aeronautics and Space Administration with respect to an invention of;
Willard F. Gillmore, Altadena, Calif.
[21] Appl. No. 63,383
[22] Filed Aug. 13, 1970
[45] Patented Dec. 28, 1971

[54] METHOD AND APPARATUS FOR HIGH-RESOLUTION SPECTRAL ANALYSIS
10 Claims, 4 Drawing Figs.

[52] U.S. Cl. .................................................. 324/77 G
[51] Int. Cl. ..................................................... G01n 23/16
[50] Field of Search .......................................... 324/77;
235/181

[56] References Cited
UNITED STATES PATENTS
2,927,272  3/1960  Gates et al. .................. 324/77 UX

*Primary Examiner*—Edward E. Kubasiewicz
*Attorneys*—G. T. McCoy, J. H. Warden and Monte F. Mott ABSTRACT: A method and apparatus for high-resolution power spectral analysis employing a digital computer is provided without stringent stability requirements on the sampling rate by using a pair of balanced mixers to combine one signal directly and in quadrature with a second signal, and alternately sampling the outputs of the mixers through an analog-to-digital converter. The computer then carries out computations of a convolution spectrum from two autocorrelation and two cross-correlation functions which can be computed from the two sequences of samples with compensation for variations in gain of the signal channels by normalizing correlation functions, and known deviation from $-90°$ in the quadrature mixing of signals by using $\phi$ in place of $-90°$ in the analysis and dividing the sum of the cross-correlation functions by $-\sin \phi$.

(a) TWO SIDED POWER SPECTRUM FOR $X_1(t)$ (b) TWO SIDED POWER SPECTRUM FOR $X_2(t)$ (c) CONVOLUTION SPECTRUM (a) ONE SIDED POWER SPECTRUM FOR $X_1(t)$ (b) ONE SIDED POWER SPECTRUM FOR $X_2(t)$ (c) CONVOLUTION SPECTRUM

WILLARD F. GILLMORE, JR.
INVENTOR.

BY *J. W. Warden*

ATTORNEYS

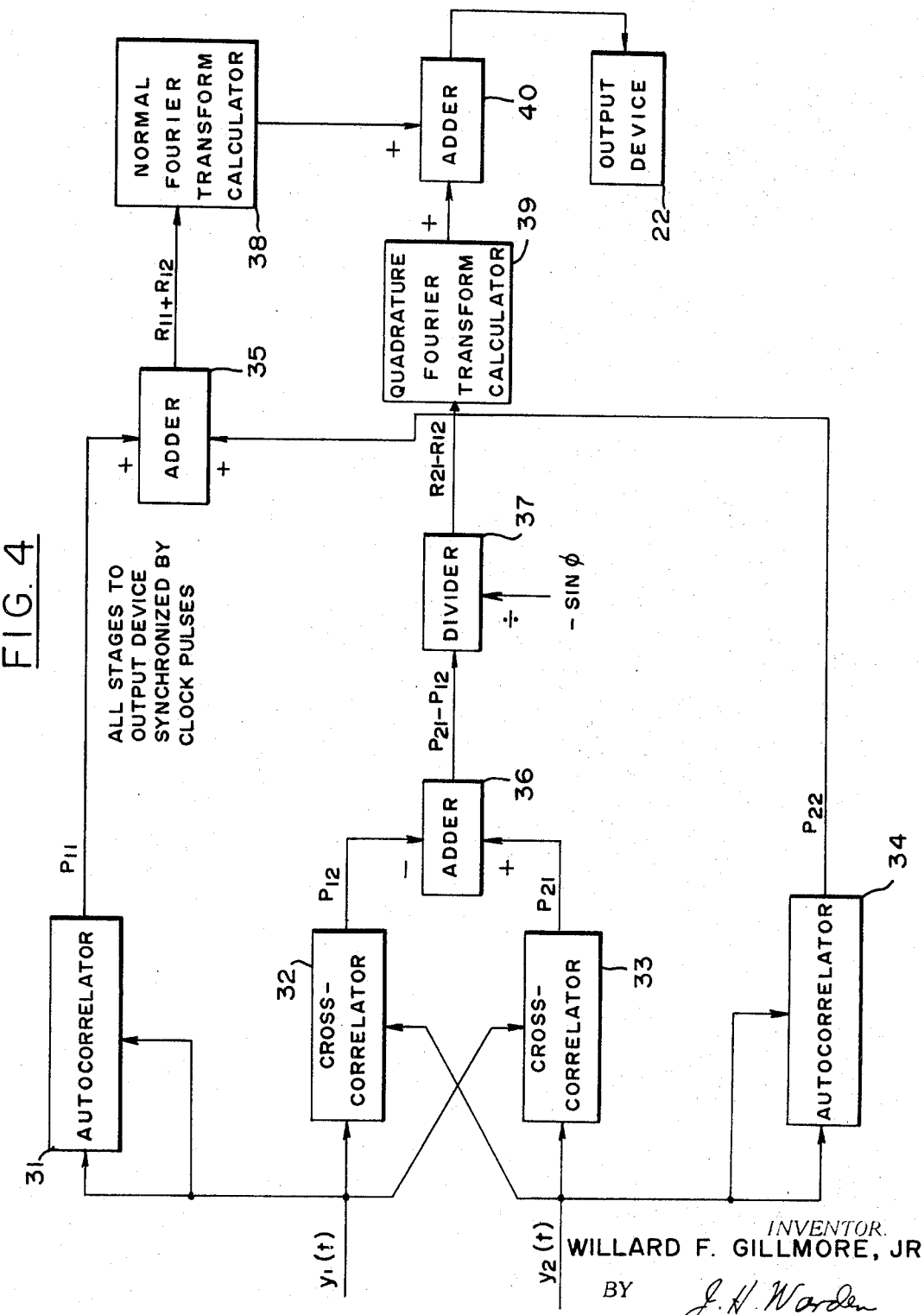

METHOD AND APPARATUS FOR HIGH-RESOLUTION SPECTRAL ANALYSIS

ORIGIN OF INVENTION

The invention described herein was made in the performance of work under a NASA contract and is subject to the provisions of Section 305 of the National Aeronautics and Space Act of 1958, Public Law 85–568 (72 state. 435; 42 USC 2457).

BACKGROUND OF THE INVENTION

This invention relates to a method and apparatus for high-resolution spectral analysis, and particularly for power spectral analysis employing a digital computer. The use of digital techniques for spectral analysis has become standard practice when high resolution is desired with accuracy. Otherwise analog techniques are quite adequate and inexpensive.

In a typical power spectrum analyzer using analog techniques, an oscilloscope is employed to display vertical spikes with amplitudes proportional to the energy distribution of the signal components (fundamental frequencies and the various harmonics of each). That is done by sweep-frequency tuning a vertical deflection amplifier and synchronously sweeping the cathode ray beam horizontally. This allows studying the power distribution of a given electrical signal by plotting relative amplitudes against a frequency base.

Digital techniques require the signal to be sampled periodically. Successive samples are quantized, usually into binary numbers, to allow a digital computer to find an autocorrelation function, compute its Fourier Transform, and print out or plot the result as ordinates of the desired power spectral density. The improvement achieved in accuracy with high resolution is inherent in the use of longer integration times. However, most previously used digital techniques require high stability sampling.

SUMMARY OF THE INVENTION

In accordance with the present invention, signals from two sources are combined in one mixer and filtered to provide only the sum or difference frequency, the latter being preferred in order to use lower sampling rates at the input of an analog-to-digital converter. Signals from the two sources are combined in quadrature in a second mixer by passing one signal through a −90° phase shift network. Output of the second mixer is filtered in the same manner as the output of the first mixer to provide a signal for construction of a complex autocorrelation function. The outputs of the two filters are periodically sampled and converted into digital form to allow the complex autocorrelation function to be constructed by a computer using digital techniques. This function has a Fourier Transform which is centered at frequency $\omega$, thus making it possible to obtain a power spectrum without ambiguity between upper and lower frequencies.

BRIEF DESCRIPTION OF THE DRAWINGS

FIG. 4 is a schematic block diagram of a digital computer in the system of FIG. 1.

DESCRIPTION OF THE PREFERRED EMBODIMENT

Figure 1:
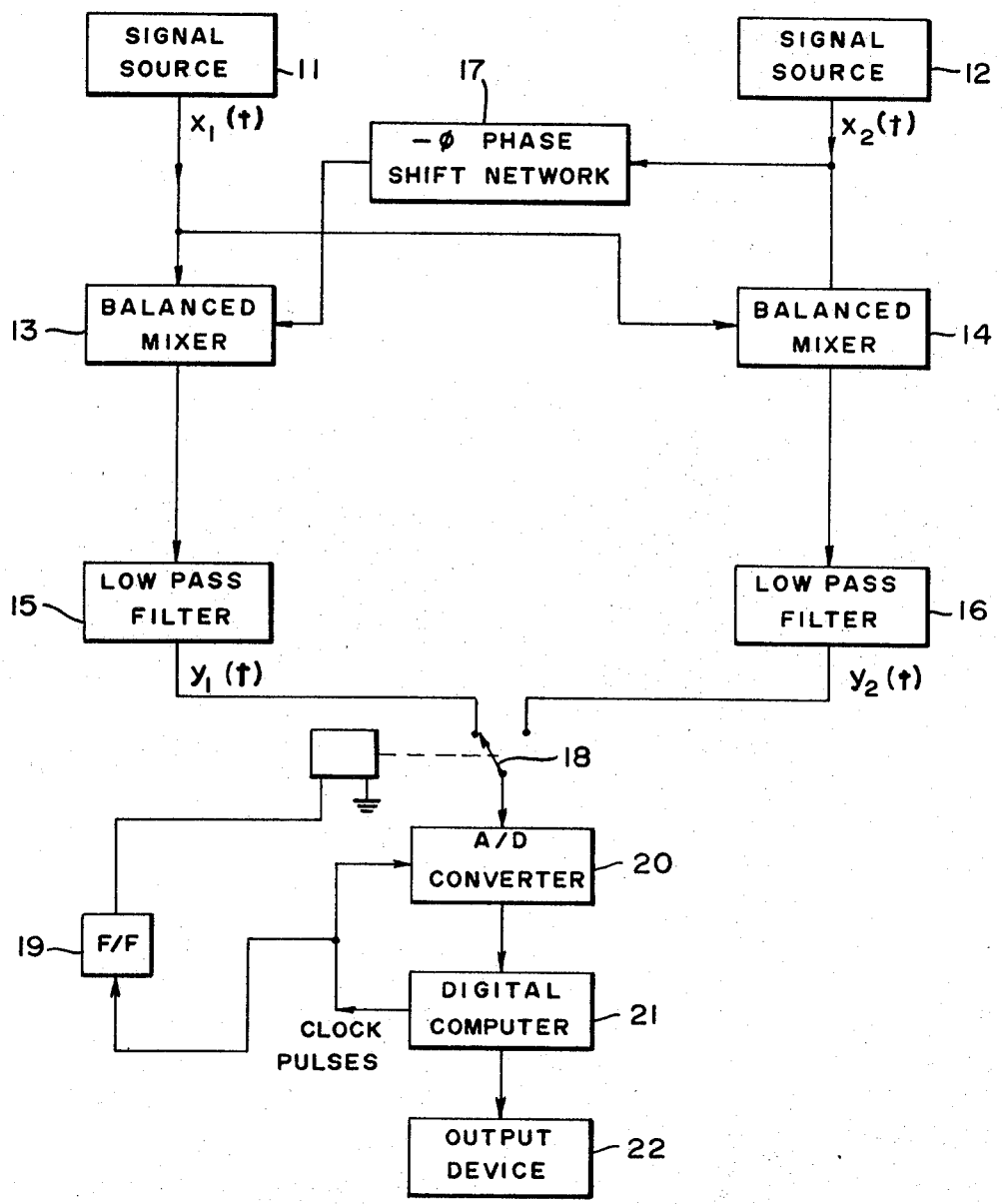
FIG. 1 is a schematic block diagram of a spectral analysis system in accordance with the invention.

Referring to FIG. 1, two input signals $x_1(t)$ and $x_2(t)$ from sources 11 and 12 are applied to mixers 13 and 14. The signal sources can be high-frequency narrow-band signal generators to provide for comparing one particular generator with a standard or for comparing two frequency standards, such as crystal oscillators or atomic frequency standards.

The mixers 13 and 14 can be ordinary balanced mixers, such as a double balanced mixer commercially available comprising a special diode bridge (ring of four hot carrier diodes) and two transformers having their secondary windings connected to different diagonals of the bridge. The input signals are applied across the primary windings of the transformers and the output signal is taken out from center taps on the secondary windings. Since the frequency of the output signal includes both the sum and the difference of the frequencies of the input signals, the desired output signal can be selected by a low-pass, high-pass or band-pass filter. In such a double balanced mixer one of the input signals should be about 10 db. below the level of the other, but this is not critical. A wide variation from this was not found to appreciably affect the spectrum.

A low-pass filter 16 provides a signal $y_2(t)$ from the output of the mixer 14 which can be expressed in the form $$y_2(t) = x_1^*(t) \, x_2(t) \quad (1)$$

where $x_1(t)$ and $x_2(t)$ are analytic signal representations of the input signals and the asterisk denotes a complex conjugate. A quadrature signal $y_1(t)$ is derived from a filter 15 connected to the mixer 13 which receives the input signal $x_2(t)$ through a plane shift network 17. The phase shift introduced is an angle $\phi$ preferably equal to exactly −90°. An exact quadrature signal is not necessary, however, so that a fixed length of coaxial cable which introduces a phase shift of about −90°, the signal $y_1(t)$ can be expressed in the form $$y_1(t) = x_1^*(t) \, [-jx_2(t)] \quad (2)$$

where $-j$ is used to represent the 90° phase shift.

There are four correlation functions which can be computed from the functions $y_1(t)$ and $y_2(t)$ as follows:

$$R_{11}(\tau) = \overline{y_1^*(t) y_1(t+\tau)}$$
$$R_{12}(\tau) = \overline{y_1^*(t) y_2(t+\tau)}$$
$$R_{21}(\tau) = \overline{y_2^*(t) y_1(t+\tau)}$$
$$R_{22}(\tau) = \overline{y_2^*(t) y_2(t+\tau)} \quad (3)$$

Real parts of equations (3) give numerical values which can be calculated. Both of the autocorrelation functions $R_{11}(\tau)$ and $R_{22}(\tau)$ are identical even functions of $\tau$ while the cross-correlation functions $R_{12}(\tau)$ and $R_{21}(\tau)$ are odd functions, each the negative of the other. By careful inspection of these equations, the desired correlation function can be expressed in the following form:

$$g(\tau) = \tfrac{1}{2}[R_{11}(\tau) + R_{22}(\tau)] + \tfrac{1}{2}j[R_{21}(\tau) - R_{12}(\tau)] \quad (4)$$

This equation maximizes the symmetry by weighing both input signals equally, minimizes certain errors due to extrinsic phase shifts and deviation of $\phi$ from −90°, and makes possible a simple correction for phase shift error in cross-correlation functions used to achieve the desired convolution output data expressed by the following highly symmetrical equation.

$$G(\omega) = \tfrac{1}{2} \int_{-\infty}^{\infty} \{[R_{11}(\tau) + R_{22}(\tau)] + j[R_{21}(\tau-) R_{12}(\tau)]\} e^{-j\omega\tau} d\tau$$

$$= \int_0^{\infty} [R_{11}(\tau) + R_{22}(\tau)] \cos \omega\tau \, d\tau$$

$$+ \int_0^{\infty} [R_{21}(t) - R_{12}(t)] \sin \omega\tau \, d\tau \quad (5)$$

This equation expresses the desired convolution spectrum in terms of correlation functions $R_{11}$, $R_{12}$, $R_{21}$ and $R_{22}$ that are easily computed from quantized samples of the signals $y_1(t)$ and $y_2(t)$.

A mercury wetted reed relay switch 18 is driven by a flip-flop 19 to alternately sample the signals $y_1(t)$ and $y_2(t)$ during successive $\Delta\tau$ sampling periods, and analog-to-digital converter 20 quantizes each sample to provide a digital computer 21 with discrete numerical values. Clock pulses from the computer 21 set the sampling periods by driving the flip-flop 19 as a binary counter, and resetting the converter 20 as the last ample value $y_1^{(m)}$ or $y_2^{(m)}$ is read into the computer 21. Thus the flip-flop 19 may be of the type which changes state with every clock pulse. Although a relay switch is shown, any suitable type of switch may be used, including a solid-state switch. The converter 20 may be any one of many commercially available that is capable of making a conversion within a sampling period. That period may be as long as desired, such as 5 milliseconds or even a few seconds, unless one of the input signals $x_1(t)$ and $x_2(t)$ is of such short duration (or stable for such a short period) that a spectral analysis dictates a higher sampling rate.

The computer 21 may be any general purpose, programmed digital computer having an input/output section for receiving data from the converter and transmitting the computed convolution spectrum to a suitable output device 22 such as a printer or a digital plotter. However, the computer 21 may also be one specially designed and assembled for computing the convolution spectrum. Before describing such a special purpose computer, and the algorithm implemented therein, a description of the difficulties arising when conventional convolution spectra are computed will be given with reference to FIGS. 2a to 2c.

In FIGS. 2a and 2b, inputs $x_1(t)$ and $x_2(t)$ are assumed to be narrow band signals with power spectra of particularly simple geometrical shapes. The usual convolution spectrum obtained from the product $x_1(t) x_2(t)$ is shown by a solid line in FIG. 2c. It may be seen how two components overlap or fold, and add to raise the level of the spectrum near the origin in FIG. 2c. Folding at the origin can be prevented by using only the higher frequency components of the convolution spectrum, but this places an unnecessary burden on the sampling rate. A better solution to this problem is to remove the requirement that $H(\omega)$ in FIG. 2c be an even function. This allows unwanted folding to be eliminated without having to move the inputs $x_1(t)$ and $x_2(t)$ farther apart in frequency.

Advantages of the present invention will become apparent from the following description and FIGS. 3a to 3c. Suppose that complex autocorrelation functions $\rho_1(t)$ and $\rho_2(t)$ are available for $x_1(t)$ and $x_2(t)$, respectively. These functions are inverse Fourier transforms of the one-sided power spectra $\Gamma_1$ and $\Gamma_2$ as indicated in the following equation.

$$\rho_k(\tau) = \frac{1}{2\pi} \int_{-\infty}^{\infty} \Gamma_k(\omega) e^{j\omega\tau} d\omega \quad k=1,2 \qquad (6)$$

The product $\rho_1(-\tau) \rho_2(\tau)$ is a useful one to consider and it corresponds to the convolution spectrum defined by the following equation.

$$G(\omega) = \frac{1}{2\pi} \int_{-\infty}^{\infty} \Gamma_1(\xi) \Gamma_2(\omega+\xi) d\xi \qquad (7)$$

This spectrum $G(\omega)$ is neither odd nor even, and it is the one which has been selected for use here.

Figure 2:
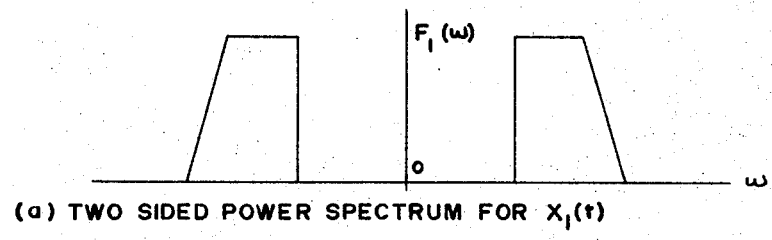
FIGS. 2a to 2c are graphical presentations of considerations involved in computing a conventional power spectrum with narrow-band input signals $x_1(t)$ and $x_2(t)$ having power spectra of simple geometrical shapes.
Figure 2:
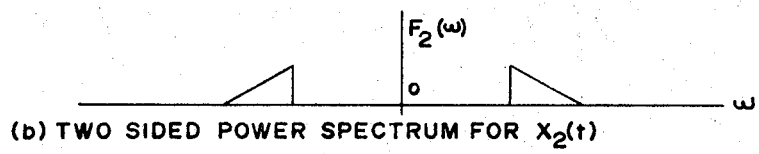
Figure 2:
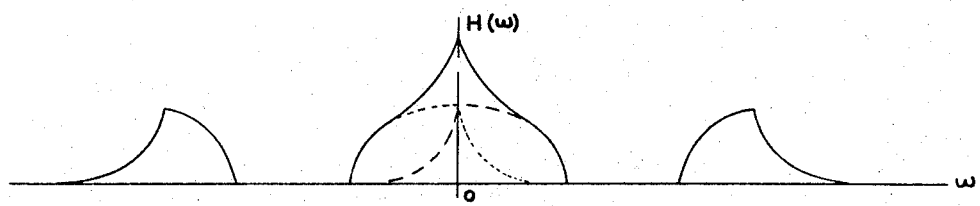

A simple example illustrating the meaning of equation (7) is shown in FIGS. 3a to 3c. One-sided spectra in FIGS. 3a and 3b represent the same inputs $x_1(t)$ and $x_2(t)$ used in FIG. 2. The convolution spectrum in FIG. 3c is the same as the component shown in FIG. 2c by the dotted line. It is interesting to note that the other product $\rho_1(\tau) \rho_2(-\tau)$ corresponds to a convolution spectrum which is the same as that of equation (7) except with the arguments of $\Gamma_1$ and $\Gamma_2$ interchanged. The power spectrum $g(\omega)$ is then reversed and the other component shown by the dashed lines in FIG. 2c is obtained.

Figure 3:
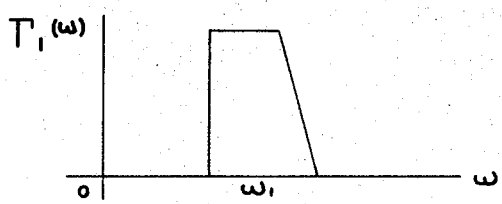
FIGS. 3a to 3c are graphical presentations of the differences in considerations involved in computing a convolution spectrum with the same signals $x_1(t)$ and $x_2(t)$ involved in the considerations of FIGS. 2a to 2c.
Figure 3:
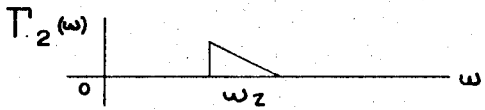
Figure 3:
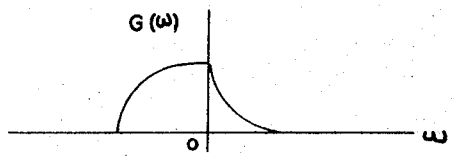

There is one special case of equation (7) and FIG. 3 which is worth considering by itself. If the input $x_1(t)$ is a perfect sine wave, then the spectrum $\Gamma_1(\omega)$ of FIG. 3a will become a $\delta$-function at frequency $\omega_1$. This causes the final convolution spectrum $G(\omega) = \Gamma_2(\omega+\omega)$ to be an exact replica of the $\Gamma_2(\omega)$ spectrum centered at frequency $\omega_2 - \omega_1$.

In order to establish and understand the equations for finding $G(\omega)$, it is helpful to represent inputs $x_1(t)$ and $x_2(t)$ as Fourier series of the form shown in the following equation, $$x(t) = a_0 + \sum_{m=1}^{\infty} (a_m \cos \omega_m t + b_m \sin \omega_m t)$$

where $$a_0 = \frac{1}{T} \int_0^T x(t) dt \quad a_m = \frac{2}{T} \int_0^T x(t) \cos \omega_m t \, dt$$

$$b_m = \frac{2}{T} \int_0^T x(t) \sin \omega_m t \, dt \qquad (8)$$

Angular frequencies $\omega_m$ are defined by $\omega_m = m\omega_o = (2\pi m)$, $T$, where $T$ is the length of a data run. The first term $a_o$ is zero in equation (8) because of transformer coupling in the two balanced mixers 13 and 14 of FIG. 1. Many of the lower order terms in this equation are also negligible when $x_1(t)$ and $x_2(t)$ are high frequency narrow band signals.

Equation (8) defines a periodic random process of period $T$. This representation is helpful because the $a_m$ and $b_m$ coefficients are independent and uncorrelated. The periodicity assumption is not a serious limitation because $T$ is normally large. Increasing $T$ may improve the accuracy of the approximation but its main effect on the computed power spectral density is to increase the resolution rather than to change the shape.

A quicker and more heuristic way to find an expression for $G(\omega)$ comes from considering the special case when $x_1(t)$ and $x_2(t)$ are sinusoidal. Consider the two exponential terms of the following equations with their complex coefficients $c_1$ and $c_2$.

$$x_1(t) = Re\{c_1 e^{j\omega_1 t}\}$$
$$x_2(t) = Re\{c_2 e^{j\omega_2 t}\} \qquad (9)$$

These two exponential terms are considered to be representations of analytic signals. Their real parts are taken simply to give expressions corresponding to measurable input voltages. The special complex autocorrelation functions $\rho_1(\tau)$ and $\rho_2(\tau)$ corresponding to $x_1(t)$ and $x_2(t)$ can be written as follows.

$$\rho_1(\tau) = |c_1|^2 e^{j\omega_1 \tau}$$
$$\rho_2(\tau) = |c_2|^2 e^{j\omega_2 \tau} \qquad (10)$$

Functions $\rho_1(\tau)$ and $\rho_2(\tau)$ can be combined to give $g(\tau)$, the autocorrelation function of the desired spectrum, in accordance with the following equation.

$$g(\tau) = \rho_1(-\tau) \rho_2(\tau) = |c_1 c_2|^2 e^{j(\omega_2 - \omega_1)\tau} \qquad (11)$$

It is now necessary to express $g(\tau)$, as some function of $y_1(t)$ and $y_2(t)$, the sampled quantities which can be expressed as follows.

$$y_1(t) = -jc_1^* c_2 e^{j(\omega_2 - \omega_1)t} \qquad (12)$$
$$y_2(t) = c_1^* c_2 e^{j(\omega_2 - \omega_1)t} \qquad (13)$$

It should be noted that equations (12) and (13) are the special cases of equations (1) and (2) which apply directly to sinusoidal signals. An asterisk is used to denote the complex conjugate, as before, and $-j$ is used to represent the phase shift of $-90°$. The four correlation functions of equations (3) can then be computed for this special case as follows:

$$R_{11}(\tau) = Re\{|c_1 c_2|^2 e^{j(\omega_2 - \omega_1)\tau}\} = |c_1 c_2|^2 \cos (\omega_2 - \omega_1)\tau$$
$$R_{12}(\tau) = Re\{j|c_1 c_2|^2 e^{j(\omega_2 - \omega_1)\tau}\} = -|c_1 c_2|^2 \sin (\omega_2 - \omega_1)\tau$$
$$R_{21}(\tau) = Re\{-j|c_1 c_2|^2 e^{j(\omega_2 - \omega_1)\tau}\} = |c_1 c_2|^2 \sin (\omega_2 - \omega_1)\tau$$
$$R_{22}(\tau) = Re\{|c_1 c_2|^2 e^{j(\omega_2 - \omega_1)\tau}\} = |c_1 c_2|^2 \cos (\omega_2 - \omega_1)\tau$$

(14)

In these equations, it is assumed that signals of the difference frequency ($\omega_2-\omega_1$) pass through the filters 15 and 16 of FIG. 1 unattenuated.

From equation (14), the desired complex correlation function of equation (4) can be written for the special sine-wave case as follows:

$$g(\tau) = \tfrac{1}{2}[R_{11}(\tau)+R_{22}(\tau)]+\tfrac{1}{2}j[R_{21}(\tau)-R_{12}(\tau)]$$
$$= |c_1 c_2|^2 e^{j(\omega_2-\omega_1)\tau} \quad (15)$$

Although programmed digital computers are considered a standard tool for high-resolution spectral analysis, the arrangement of input channels to the computer 21 illustrated in FIG. 1 provides advantages over the prior art. The most important is the ease with which a computer may be programmed or otherwise designed to compensate for variations in gain. It is likely that the two channels will have somewhat different gains due to differences in the mixers and low-pass filters. Input signal levels can also vary considerably from one test to the next. The computer may be programmed or otherwise designed to function as an ideal automatic gain control simply by having it normalize the sampled data.

The following equations show how the normalized correlation functions are computed. First the unnormalized correlation functions, designated as "Q's," are computed using standard digital techniques which may be implemented by a stored program in a general purpose digital computer.

$$Q_{11}^{(k)} = \frac{1}{n-k}\sum_{m=1}^{n-k} y_1^{(m)} y_1^{(m+k)}$$

$$Q_{12}^{(k)} = \frac{1}{n-k}\sum_{m=1}^{n-k} y_1^{(m)} y_2^{(m+k)}$$

$$Q_{21}^{(k)} = \frac{1}{n-k}\sum_{m=1}^{n-k} y_2^{(m)} y_1^{(m+k)}$$

$$Q_{22}^{(k)} = \frac{1}{n-k}\sum_{m=1}^{n-k} y_2^{(m)} y_2^{(m+k)}$$

(16)

From these "Q's," the normalized "P's" are computed, still using the digital techniques employed for the "Q's."

$$P_{11}^{(k)} = \frac{Q_{11}^{(k)} - \mu_1^2}{\sigma_1^2}$$

$$P_{12}^{(k)} = \frac{Q_{12}^{(k)} - \mu_1\mu_2}{\sigma_1\sigma_2} \quad (17)$$

$$P_{21}^{(k)} = \frac{Q_{21}^{(k)} - \mu_2\mu_1}{\sigma_2\sigma_1}$$

$$P_{22}^{(k)} = \frac{Q_{22}^{(k)} - \mu_2^2}{\sigma_2^2}$$

where $$\mu_1 = \frac{1}{n}\sum_{m=1}^{n} y_1^{(m)} \quad \mu_2 = \frac{1}{n}\sum_{m=1}^{n} y_2^{(m)}$$

$$\sigma_1^2 = \frac{1}{n}\sum_{m=1}^{n} [y_1^{(m)} - \mu_1]^2 \quad \sigma_2^2 = \frac{1}{n}\sum_{m=1}^{n} [y_2^{(m)} - \mu_2]^2$$

The number $n$ is the total number of samples in the data run. A superscript in parentheses is used to indicate the time argument of any variable in terms of the number of elapsed sampling intervals. Quantities $\mu_1$ and $\mu_2$ represent the means of the $y_1(t)$ and $y_2(t)$ samples, and quantities $\sigma_1$ and $\sigma_2$ represent the standard deviations defined in terms of basic sample data.

Another advantage of the present invention is the ease with which compensation may be introduced for variations in phase shift caused by the mixers 13 and 14, and the phase shift network 17. If the difference in phase $\phi$ between $y_1(t)$ and $y_2(t)$ is known, the derivation of equation (5) can be reworked using $\phi$ in place of $-90°$. This leads immediately to the conclusion that the correlation functions of equation (17) should be corrected before using them in equation (5) as follows.

$$[R_{21}^{(m)} - R_{12}^{(m)}] = -\frac{[P_{21}^{(m)} - P_{12}^{(m)}]}{\sin\phi} \quad (18)$$

$$[R_{11}^{(m)} + R_{22}^{(m)}] = [P_{11}^{(m)} + P_{22}^{(m)}] \quad (19)$$

The correction indicated in equation (18) works not only for slow day to day variations in $\phi$ which may approach a degree or two, but also for constant errors as well. Thus, a fixed length of coaxial cable can be used in place of an adjustable phase shifter which would otherwise be required.

Still another advantage is removal of the requirement that $y_1(t)$ and $y_2(t)$ be simultaneous samples. This can save considerable expense and complexity by allowing a simple single-pole, double-throw relay switch to be used in place of a more elaborate multiplexer which allows simultaneous sampling. Alternate sampling gives the relay an equal time to change from either position. The autocorrelation functions $R_{11}$ and $R_{22}$ remain the same but the cross-correlation functions $R_{12}$ and $R_{21}$ must be corrected by half the sampling period. To accomplish that, equation (5) may be rewritten in the following form.

$$G(\omega) = \frac{\Delta\tau}{2}[R_{11}^{(0)} + R_{22}^{(0)}] + \Delta\tau \sum_{m=1}^{M}[R_{11}^{(m)}$$

$$+ R_{22}^{(m)}] \cos\frac{sm\pi}{S} + \Delta\tau \sum_{m=1}^{M}[R_{21}^{(m-1/2)}$$

$$- R_{12}^{(m-1/2)}] \sin\frac{s(m-1/2)\pi}{S} \quad (20)$$

Where $s = 0, \pm 1, \pm 2, ..., \pm S$ is used to identify any particular one of the $2S \pm 1$ values of $\omega$ at which applying numerical integration to equation (5).

The present invention may also be used to advantage with a special-purpose computer by including in it provision for normalizing the sampled data in accordance with equations (16) and (17), making the correction indicated by equation (18), and compensating for alternate sampling with equation (20). The proper value for $\phi$ is entered before each data run. In a programmed digital computer, a special subroutine can be provided to determine the actual phase difference between the signals $x_1(t)$ and $x_2(t)$.

The computer 21 will now be described with reference to FIG. 4 as a special-purpose computer, although it is understood that a programmed general-purpose computer may be employed just as well to implement equations (16) to (20). As seen from FIG. 4, the sampled signal values $y_1(t)$ and $y_2(t)$ are supplied to four correlators 31 through 34, which operate on the $n-k$ samples of incoming data to compute the correlation functions defined by equation (16). Hardware realization of these correlators can vary considerably, particularly when simplifying assumptions are made. It is possible to effect a significant saving by taking the input signals to be stationary and ergodic, and keeping the number of input samples large compared to the number of points computed in correlation functions (e.g., having $n$ in the order of 10,000 and M equal to 100 or 1,000).

Each of the correlator stages 31 to 34 is connected to its appropriate adder 35 or 36. A divider 37 is used to account for the phase angle $-\phi$ introduced by the phase shift network 17.

Outputs from the adder 35 and the divider 37 are defined by equations (18) and (19). The power spectral density $G(\omega)$ is computed in two parts by Fourier Transform stages 38 and 39. A considerable amount of complexity and running time may be avoided by using stored sine and cosine tables to mechanize these Fourier Transform calculations. An adder 40 combines these parts and delivers the final result to the output device 22. The Fourier Transform Calculator stage 38 operates in a normal manner and computes the constant and cosine terms in equation (20). The Fourier Transform Calculator stage 39 is somewhat similar in operation and computes the sine terms in equation (20). This stage also adjusts the argument of each sine term by half the sampling period to correct for alternate sampling.

As an example of a practical application, the present invention was used to check the stability of an oscillator. The input $x_1(t)$ was from the oscillator and the input $x_2(t)$ was from a very stable frequency standard, with both signals centered at approximately 35 MHz and a sampling period $\Delta\tau$ of 2 seconds. The width of the spectrum obtained is an indication of the stability of the oscillator. Narrower spectra are produced by more stable oscillators.

A piece of coaxial cable of approximately the correct length was used for the phase shift network. Its exact phase shift $\phi$ was first determined, and then its sine was entered in the implementation of equation (18). The exact phase shift value was found just prior to taking the data for finding $G(\omega)$ by setting $x_1(t)$ and $x_2(t)$ to coherently derived frequencies 0.01 Hz. apart. A computer then sampled $y_1(t)$, and fit a sine wave to each waveform. A value of the phase shift $\phi$ was then found from the two fitted waveforms.

Another exemplary use of the present invention is in the comparison of three frequency standards. Here it is possible to determine the general nature of each individual spectrum. The following equations (21) show one way this can be done.

$$g_1(\tau) = \rho_1(-\tau)\rho_1(\tau) = \frac{[\rho_1(-\tau)\rho_2(\tau)][\rho_3(-\tau)\rho_1(\tau)]}{[\rho_3(-\tau)\rho_2(\tau)]}$$

$$g_2(\tau) = \rho_2(-\tau)\rho_2(\tau) = \frac{[\rho_2(-\tau)\rho_3(\tau)][\rho_1(-\tau)\rho_2(\tau)]}{[\rho_1(-\tau)\rho_3(\tau)]}$$

$$g_3(\tau) = \rho_3(-\tau)\rho_3(\tau) = \frac{[\rho_3(-\tau)\rho_1(\tau)][\rho_2(-\tau)\rho_1(\tau)]}{[\rho_2(-\tau)\rho_1(\tau)]}$$

(21)

Input signals are labeled with subscripts 1, 2 and 3 and their corresponding one-sided autocorrelation functions appear as "$\rho$'s" in equation (21). Each expression in brackets has the form of equation (11) and is the complex inverse Fourier Transform of $G(\omega)$ computed in equation (20). The proper connection of the three signals to inputs $x_1(t)$ and $x_2(t)$ of FIG. 1 can be determined by comparing the subscripts in equation (21) with those in equation (11). Theoretically, a zero of any denominator in equation (14) is cancelled by one in the corresponding numerator and $g(\tau)$ cannot have poles. If a pole should occur numerically by accident, special interpolation may be necessary. Such a situation is extremely rare, however. Each of the functions $g_1(\tau)$, $g_2(\tau)$ and $g_3(\tau)$ is a real even function which represents the square of the magnitude of the respective one-sided autocorrelation function. Fourier transforms of equation (21) are the special convolution spectra of each signal with itself. The width of these spectra will appear to be about twice that of the original power spectra.

Sometimes a more qualitative idea of the performance of the three frequency standards will suffice. In this case there is no need to use equation (21). One standard can be sought which, when compared to each of the others, exhibits some salient spectral feature such as broad central peaks or high adjacent skirts. These observations can be very helpful in qualitatively evaluating the performance of a frequency standard.

What is claimed is:

1. A high-resolution spectral analysis system comprising:
   a first source of an electrical signal;
   a second source of an electrical signal;
   a first balanced mixer connected to said first and second signal sources for combining signals therefrom to provide a first product signal;
   means connected to said second signal source for shifting said signal therefrom by approximately $-90°$;
   a second balanced mixer connected to said first source of an electrical signal and to said phase shifting means for combining signals therefrom to provide a second product signal in quadrature with said first product signal;
   means connected to said first and second mixers for periodically sampling said first and second product signals to produce discrete signal samples;
   means for converting each of said discrete signal samples into a digital form comprising a number the value of which is proportional to the amplitude of the sample converted; and
   computing means connected to said sampling means for carrying out a spectral analysis on sampled data therefrom.

2. A system as defined in claim 1 wherein said computing means comprises:
   means for computing two autocorrelation functions $R_{11}$ and $R_{22}$ and two cross correlation functions $R_{12}$ and $R_{21}$ from said first and second product signals; and
   means for computing by numerical integration a desired convolution spectrum in accordance with the following equation:

$$G(\omega) = \int_0^\infty [R_{11}(\tau) + R_{22}(\tau)] \cos \omega\tau \, d\tau$$

$$+ \int_0^\infty [R_{21}(\tau) - R_{12}(\tau)] \sin \omega\tau \, d\tau$$

3. A system as defined in claim 2 wherein said computer provides compensation for variations in gain in the production of said first and second product signals by normalizing said sampled data employed in computing said correlation functions.

4. A system as defined in claim 2 wherein said computer provides compensation for deviation in said phase shift angle from $-90°$ by dividing the difference between cross correlation functions by the sine of the angle of actual phase shift provided.

5. In a method for high-resolution spectral analysis of first and second signals from independent sources using a digital computer, wherein a desired convolution spectrum is translated to the origin without folding, the following steps:
   combining said first and second signals to provide a first product signal;
   shifting said second signal by approximately $-90°$ to provide a phase-shifted second signal;
   combining said first signal and said phase-shifted second signal to provide a second product signal in quadrature with said first product signal;
   periodically sampling said first and second product signals to produce discrete signal samples;
   converting each of said discrete signal samples into a number in digital form, the value of said number being directly proportional to the amplitude of the sampled converted; and
   supplying to said digital computer each of said discrete signal samples in digital form for said spectral analysis.

6. A method as defined in claim 5, wherein said spectral analysis comprises:
   computing the sum of first and second autocorrelation functions $R_{11}(\tau)$ and $R_{22}(\tau)$;
   computing the difference of first and second cross-correlation functions $R_{12}(\tau)$ and $R_{21}(\tau)$; and
   computing by numerical integration said desired convolution spectrum in accordance with the following equation:

$$G(\omega)=\int_0^\infty [R_{11}(\tau)+R_{22}(\tau)] \cos \omega\tau d\tau$$
$$+\int_0^\infty [R_{21}(\tau)-R_{12}(\tau)] \sin \omega\tau d\tau$$

where $\tau$ is the sampling time.

7. A method as defined in claim 6, wherein said computer provides compensation for variations in gain in the production of said first and second product signals by normalizing said first and second autocorrelation functions, and said first and second cross-correlation functions.

8. A method as defined in claim 6, wherein said computer provides compensation for variation in phase shift of said phase shifted signal from $-90°$ by computing said difference between cross-correlation functions from uncompensated difference between cross-correlation functions, and dividing said uncompensated difference by $-\sin \phi$, where $\phi$ is the value of actual phase shift in degrees.

9. The method defined in claim 5, wherein said spectral analysis comprises the following steps:
computing two normalized correlation functions $P_{11}$ and $P_{22}$ and two normalized cross-correlation functions $P_{12}$ and $P_{21}$ from said first and second product signals, where the subscript digits 1 and 2 correspond to the first and second product signals, and the second digit of each subscript corresponds to a product signal delayed with respect to the other product signal;
computing the sum $P_{11}$ and $P_{22}$ of said autocorrelation functions, and the difference of said normalized cross-correlation functions $P_{21}-P_{12}$; and
compensating for variations in phase shift of said phase shifted signal from $-90°$ by dividing said difference $P_{21}-P_{12}$ by $-\sin \phi$, where $\phi$ is the value of the actual phase shift in degrees; and
finding the power spectral density $G(\omega)$ in accordance with the following equation:

$$G(\omega)=\int_0^\infty [R_{11}(\tau)+R_{22}(\tau)] \cos \omega\tau d\tau$$
$$+\int_0^\infty [R_{21}(\tau)-R_{12}(\tau)] \sin \omega\tau d\tau$$

where $\tau$ refers to the sampling time, the sum $R_{11}(\tau)+R_{22}(\tau)$ is the sum of said autocorrelation functions, and the difference $R_{21}(\tau)-(\tau)$ is the phase shift compensated difference of said cross-correlation functions.

10. A method as defined in claim 9, wherein said computer provides compensation for variations in gain in the production of said first and second product signals by normalizing said autocorrelation and cross-correlation functions.

* * * * *